United States Patent
Bhandare et al.

(10) Patent No.: US 9,692,518 B2
(45) Date of Patent: Jun. 27, 2017

(54) METHOD AND APPARATUS FOR STABILIZATION OF OPTICAL TRANSMITTER

(71) Applicant: Finisar Corporation, Horsham, PA (US)

(72) Inventors: Suhas P. Bhandare, Levitton, PA (US); Heider N. Ereifej, Quakertown, PA (US); Kyu Kim, North Wales, PA (US); Mark Colyar, New Hope, PA (US)

(73) Assignee: Finisar Corporation, Horsham, PA (US)

( * ) Notice: Subject to any disclaimer, the term of this patent is extended or adjusted under 35 U.S.C. 154(b) by 84 days.

(21) Appl. No.: 14/415,602

(22) PCT Filed: Jul. 17, 2013

(86) PCT No.: PCT/US2013/050895
§ 371 (c)(1),
(2) Date: Jan. 18, 2015

(87) PCT Pub. No.: WO2014/015043
PCT Pub. Date: Jan. 23, 2014

(65) Prior Publication Data
US 2015/0207569 A1 Jul. 23, 2015

Related U.S. Application Data

(63) Continuation of application No. 13/553,936, filed on Jul. 20, 2012, now Pat. No. 8,849,129.

(51) Int. Cl.
*H04B 10/50* (2013.01)
*H04B 10/532* (2013.01)
(Continued)

(52) U.S. Cl.
CPC ... *H04B 10/5053* (2013.01); *H04B 10/50575* (2013.01); *H04B 10/532* (2013.01); *H04B 10/5561* (2013.01); *H04J 14/06* (2013.01)

(58) Field of Classification Search
CPC H04B 10/5053; H04B 10/50575; H04J 14/06
See application file for complete search history.

(56) References Cited

U.S. PATENT DOCUMENTS 4,871,920 A * 10/1989 Stabile .................. H04B 10/69
250/551
6,316,268 B1 * 11/2001 Yang ...................... B82Y 30/00
422/82

(Continued)

FOREIGN PATENT DOCUMENTS

EP 2 164 199 A2 3/2010
EP 2 169 851 A2 3/2010

(Continued)

OTHER PUBLICATIONS

"Office Action" for Canadian Patent Application No. 2,879,461, Apr. 22, 2015, 3 pages, Canadian Intellectual Property Office, Canada.

(Continued)

*Primary Examiner* — David Payne
*Assistant Examiner* — Casey Kretzer
(74) *Attorney, Agent, or Firm* — Kurt Raushenbach; Raushenbach Patent Law Group, LLC

(57) ABSTRACT

A DP-QPSK optical transmitter includes an outer MZM comprising a first parent MZM comprising a first child MZM and a second child MZM that modulates a QPSK signal with a first polarization. A second parent MZM includes a first child MZM and a second child MZM that modulates a QPSK signal with a second polarization. The outer Mach-Zehnder modulator multiplexes the first and second polarization embedded into a dual-polarization (Continued)

QPSK signal generation. A first optical detector detects the QPSK signal generated by the first parent MZM with the first polarization. A second optical detector optical detects the QPSK signal generated by the second parent Mach-Zehnder modulator with the second polarization. A bias control circuit generates bias signals on at least one output that stabilize the DP-QPSK signal in response to signals generated by the first and second optical detector using electrical time division multiplexing.

19 Claims, 7 Drawing Sheets

(51) Int. Cl.
*H04B 10/556* (2013.01)
*H04J 14/06* (2006.01)

(56) References Cited

U.S. PATENT DOCUMENTS

| | | | | |
|---|---|---|---|---|
| 6,778,310 B2* | 8/2004 | Puleo | ............... | H04B 10/508 |
| | | | | 359/239 |
| 7,079,780 B1* | 7/2006 | Rollins | ............... | H04B 10/505 |
| | | | | 359/238 |
| 7,266,306 B1 | 9/2007 | Harley et al. | | |
| 8,849,129 B2 | 9/2014 | Bhandare et al. | | |
| 2002/0197016 A1 | 12/2002 | Chandrasekhar et al. | | |
| 2003/0123813 A1 | 7/2003 | Ravasio et al. | | |
| 2007/0133918 A1 | 6/2007 | Cho et al. | | |
| 2007/0237194 A1* | 10/2007 | Shahine | ............... | H01S 5/06832 |
| | | | | 372/29.011 |
| 2007/0264028 A1 | 11/2007 | Yuki et al. | | |
| 2008/0074722 A1 | 3/2008 | Kang | | |
| 2008/0080872 A1 | 4/2008 | Tanaka et al. | | |
| 2008/0131137 A1 | 6/2008 | Okabe et al. | | |
| 2009/0115544 A1 | 5/2009 | Kershteyn et al. | | |
| 2010/0021175 A1 | 1/2010 | Kagawa | | |
| 2010/0142964 A1 | 6/2010 | Chang et al. | | |
| 2010/0202785 A1 | 8/2010 | Kawanishi et al. | | |
| 2010/0303469 A1* | 12/2010 | Barton | ............... | H04B 10/505 |
| | | | | 398/184 |
| 2011/0013907 A1 | 1/2011 | Sugihara et al. | | |
| 2011/0043888 A1 | 2/2011 | Lee | | |
| 2011/0164300 A1* | 7/2011 | Shen | ............... | G02F 1/0123 |
| | | | | 359/238 |
| 2012/0093248 A1 | 4/2012 | Kwon et al. | | |
| 2012/0294622 A1 | 11/2012 | Holroyd et al. | | |
| 2014/0023368 A1 | 1/2014 | Bhadare et al. | | |

FOREIGN PATENT DOCUMENTS

| | | |
|---|---|---|
| EP | 2 169 851 A3 | 5/2010 |
| EP | 2 280 498 A1 | 2/2011 |
| EP | 2 164 199 A3 | 4/2012 |
| JP | 2003-338805 | 11/2003 |
| JP | 2008-187223 | 8/2008 |
| JP | 2009-246578 A | 10/2009 |
| JP | 2010-81287 | 4/2010 |
| JP | 2010-243953 A | 10/2010 |
| JP | 2011-28087 A | 2/2011 |
| JP | 2011-166249 A | 8/2011 |
| JP | 2011-188044 A | 9/2011 |

OTHER PUBLICATIONS

"Office Action" for Japanese Patent Application No. 2015-523225, Jun. 9, 2015, 10 pages, Japanese Intellectual Property Office, Japan.
"Office Action" for Chinese Patent Application No. 201380048724.7, Sep. 30, 2015, 10 pages, State Intellectual Property Office of the People's Republic of China, Beijing, China.
"Notification Concerning Transmittal of International Preliminary Report on Patentability (Chapter I of the Patent Cooperation Treaty" for PCT/US2013/050895, Jan. 29, 2015, 10 pages, The International Bureau of WIPO, Geneva, Switzerland.
"Office Action" for U.S. Appl. No. 13/553,936, Jan. 16, 2014, 34 pages, USPTO.
"Response to Office Action" for U.S. Appl. No. 13/553,936, Jul. 14, 2014.
"Office Action" for Chinese Patent Application No. 201380048724.7, Mar. 1, 2016, 9 pages, State Intellectual Property Office of the People's Republic of China, China.
"Office Action" for Chinese Patent Application No. 201380048724.7, Jun. 1, 2016, 4 pages, State Intellectual Property Office of the People's Republic of China, Beijing, China.
"International Search Report" for PCT/U2013/050895, Oct. 25, 2013, 3 pages, Korean Intellectual Property Office, Daejeon Metropolitan City, Republic of Korea.
Office Action for Japanese Patent Application No. 2015-523225, dated Nov. 13, 2015, 6 pages, Japanese Patent Office, Japan.
"European Search Report" for European Patent Application No. 13820405.2, Jul. 1, 2016, 9 pages, European Patent Office, Munich, Germany.
Office Action for Chinese Patent Application No. 201380048724.7, Sep. 29, 2016, 3 pages, State Intellectual Property Office of the People's Republic of China, Beijing, China.

* cited by examiner

METHOD AND APPARATUS FOR STABILIZATION OF OPTICAL TRANSMITTER

CROSS REFERENCE TO RELATED APPLICATION SECTION

The present application is a 35 U.S.C. §371 application based on International Patent Application No. PCT/US13/50895, filed Jul. 17, 2013, entitled "Method And Apparatus For Stabilization Of Optical Transmitter", which claims priority to U.S. patent application Ser. No. 13/553,936, filed Jul. 20, 2012, entitled "Method And Apparatus For Stabilization Of Optical Transmitter," which is now U.S. Pat. No. 8,849,129. The entire contents of International Patent Application No. PCT/US13/50895 and U.S. Pat. No. 8,849,129 are herein incorporated by reference.

The section headings used herein are for organizational purposes only and should not to be construed as limiting the subject matter described in the present application in any way.

INTRODUCTION

The increasing need for high bit-rate data transmissions through optical fibers presents significant challenges to the fiber-optic telecommunications industry. For example, high bit-rate systems are highly susceptible to optical fiber non-linearities. In addition, the high bit-rate systems make electronic processing of data very difficult.

One option to confront these challenges is to transmit the data in a Dual-Polarization Quadrature Phase-Shift Keying (DP-QPSK) format. Quadrature phase shift keying involves representing the data in the complex plane, so that each symbol consists of a real (in-phase) and an imaginary (quadrature phase) part. In the DP-QPSK modulation format, independent data transmissions take place on two orthogonal polarizations. One signal is transmitted in the horizontal polarization and the other signal is transmitted in the vertical polarization. However, both signals have the same optical frequency, and they are polarized 90° with respect to each other so they do not interfere. Unlike a traditional modulation format, where the signal is in either a "1" or a "0" level once per timeslot, QPSK enables the modulation of two bits per time slot because the signal can be in one of four different phase states. That is, the signal could be a (0, 0); (1, 1); (0, 1); or (1, 0).

Dual Polarization QPSK modulation effectively lowers the baud rate of the system, by transmitting four bits per optical symbol, which keeps the optical spectrum four times narrower than if the baud rate had not been reduced. Thus, theoretically, the DP-QPSK data rate is two times the QPSK data rate, which equals the transmission of four bits per time slot as seen by the receiver in just one quarter of the receiver bandwidth. Thus, the dual polarization provides twice the information per time slot and the QPSK signal provides twice as many bits per time slot compared to the conventional on-off keying modulation format. As a result, each of the dual-polarization data modulation signals only need to be modulated with data at one quarter of the desired bit rate. This means that the baud rate, or number of symbols transmitted per second, can actually be one half of the bit rate. When polarization multiplexing is also used, a system achieves a bit rate that is four times that of its baud rate. The reduced data rate narrows the optical bandwidth required to send the signal, allowing more optical channels in the same spectral band. Therefore, the electronics processes a signal that is a factor of four times slower than the actual data rate. The information can then be processed by commonly available digital signal processing (DSP) hardware and software which significantly reduce the requirements of the optical interworking hardware.

DP-QPSK reception is based on detection of the optical phase of the signal, which necessitates the use of coherent detection. In coherent detection, the output of a local oscillator operating at a similar wavelength is mixed with the incoming signal at the receiving end, which provides the ability to recover the optical phase of the signal using an array of four photodetectors. The coherent receiver is designed to lock onto the frequency and phase of the incoming signal and is thus able to recover the incoming dual polarization QPSK bits appropriately. After detection, the real voltages are reassigned to their respective types (in-phase or quadrature phases) so that the data can be recovered. Digital post-processing techniques are often used to compensate for distortion and error introduced by the transmission process.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. In the drawings, like reference characters generally refer to like features and structural elements throughout the various figures. The drawings are not intended to limit the scope of the Applicants' teaching in any way.

DESCRIPTION OF VARIOUS EMBODIMENTS

Figure 1:
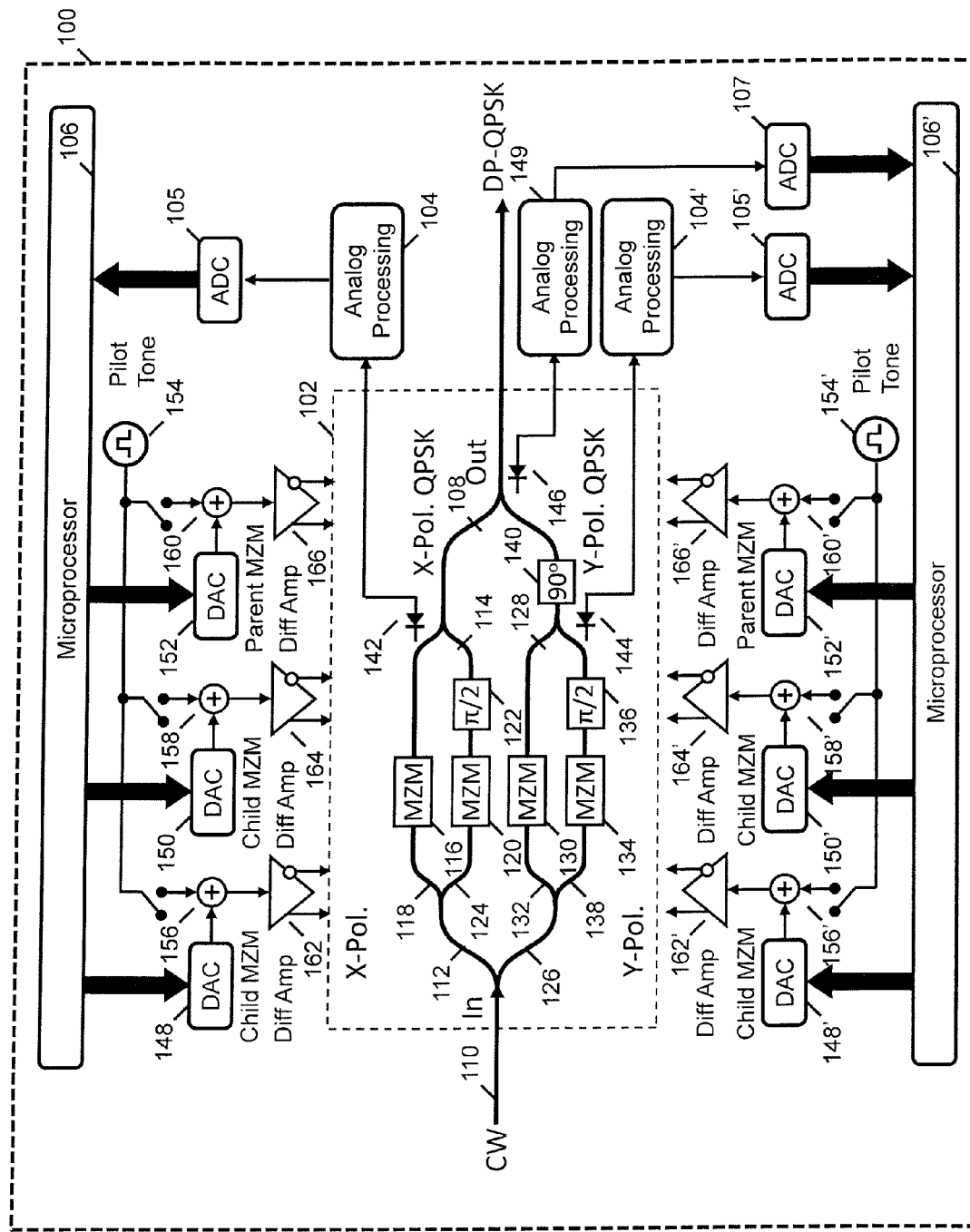
FIG. 1 illustrates a block diagram of one embodiment of a DP-QPSK optical transmitter according to the present teaching.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

The present teaching relates to methods and apparatus for implementing a digital time division multiplexed optical transmitter for transmitting high data rate DP-QPSK signals over long-haul fiber optic networks. Some methods and apparatus according to the present teaching use lock-in stabilization of lithium niobate-based time division multiplexed optical transmitter for high data rate transmission. For example, transmitters according to the present teaching can generate DP-QPSK signals at 100-Gb/s for transmission over long-haul fiber optic networks. The DP-QPSK modulation format is particularly attractive for high data rate optical transmission (100-Gb/s and higher) in metro areas networks as well as long haul fiber-optic networks.

A high data rate DP-QPSK optical transmitter according to the present teaching is described as having a Mach-Zehnder type optical modulator which has two parallel Mach-Zehnder type superstructures. A first Mach-Zehnder type superstructure is used for a first polarization. A second Mach-Zehnder type superstructure is used a second polarization. Each of the two parallel Mach-Zehnder superstructures includes two parallel child Mach-Zehnder optical modulators. One skilled in the art will appreciate that numerous types of Mach-Zehnder modulators can be used, such as Mach-Zehnder modulators formed of lithium niobate, Mach-Zehnder modulators formed of III-V compound semiconductors, such as GaAlAs on GaAs, and Mach-Zehnder modulators formed of II-VI semiconductor, such as InP.

FIG. 1 illustrates a block diagram of one embodiment of a DP-QPSK optical transmitter 100 according to the present teaching. The DP-QPSK optical transmitter 100 includes a DP-QPSK modulator 102 and associated hardware that differentially drives the modulator 102 components under microprocessor control. Many aspects of the optical transmitter of the present teaching is described in connection with the D-QPSK modulation format. However, one skilled in the art will appreciate that the transmitter and methods of transmitting according to the present teaching can be used with numerous other types of modulator formats, such as BPSK, m-ary QAM, m-ary PSK, OFDM, and any dual-polarization variant of these modulations forms. In addition, some aspects of the DP-QPSK optical transmitter 100 are described in connection with Mach-Zehnder modulators (MZMs) and more particularly described in connection with lithium niobate-based Mach-Zehnder modulators. However, one skilled in the art will appreciate that other types of modulators, such as electro-absorption modulators, can be used with the transmitter according to the present teaching.

Lithium niobate-based Mach-Zehnder modulators have certain desirable features for high data rate transmitters, such as being stable against numerous types of environmental variations so that they can generate very reliable and repeatable high data rate transmissions at 100 Gb/s and higher. In particular, lithium niobate-based Mach-Zehnder modulators can have highly stable operation under large operating temperature variations. In one aspect of the optical transmitter of the present teaching, the DP-QPSK lithium niobate optical modulators are stabilized using various lock-in techniques, which can be performed automatically under microprocessor control. Analog signal processors 104, 104' and microprocessors 106, 106' are used to determine the various operating points of the parent and child Mach-Zehnder modulators.

The DP-QPSK optical transmitter 100 includes an outer Mach-Zehnder modulator 108 that includes an optical input 110 that receives an optical beam from a laser source. In many embodiments, the laser source is a tunable laser source. A first arm of the outer Mach-Zehnder modulator 112 includes a first parent Mach-Zehnder modulator 114. The first parent Mach-Zehnder modulator 114 includes a first child Mach-Zehnder modulator 116 that is optically coupled into a first arm 118. A second child Mach-Zehnder modulator 120 is optically coupled to a π/2 optical phase shifter 122 and optically coupled into a second arm 124. The first parent Mach-Zehnder modulator 114 modulates a QPSK signal with a first polarization.

A second arm 126 of the outer Mach-Zehnder modulator 108 includes a second parent Mach-Zehnder modulator 128 that includes a first child Mach-Zehnder modulator 130 optically coupled into a first arm 132. A second child Mach-Zehnder modulator 134 is optically coupled to a π/2 optical phase shifter 136 and optically coupled into a second arm 138. An optical polarization rotator 140 is also optically coupled into the second arm 126 of the outer Mach-Zehnder modulator 108. In some embodiments, the optical polarization rotator 140 is a fixed π/2 polarization rotator. In other embodiments, the optical polarization rotator 140 is a variable polarization rotator. The second parent Mach-Zehnder modulator 128 modulates a QPSK signal with a second polarization. The outer Mach-Zehnder modulator 108 multiplexes the first and second polarization embedded into a dual-polarization QPSK signal generation.

In one specific embodiment, the first and second parent Mach-Zehnder modulators 114, 128 and each of the first and second child Mach-Zehnder modulators 116, 120, 130, and 134 are all lithium niobate based Mach-Zehnder modulators. In this embodiment, the four individual child Mach-Zehender modulators 116, 120, 130, and 134 are driven by an electrical NRZ signal with a peak-to-peak voltage swing of $2V_\pi$ and biased at the point of minimum transmission to generate four PSK signals. In other embodiments, some of these modulators are other types of Mach-Zehnder modulators such as III-V or II-V semiconductor Mach Zehnder modulators. In yet other embodiments, electro-absorption modulators can be used instead of Mach-Zehnder modulators. In these embodiments, the first and second parent Mach-Zehnder modulators 114, 128 are biased at the quadrature point to generate QPSK signals in first and second polarization.

A first optical detector 142 is optically coupled to an output of the first parent Mach-Zehnder modulator 114. The first optical detector 142 detects the QPSK signal generated by the first parent Mach-Zehnder modulator 114 with the first polarization. A second optical detector 144 is optically coupled to an output of the second parent Mach-Zehnder modulator 128. The second optical detector 144 detects the QPSK signal generated by the second parent Mach-Zehnder modulator 128 with the second polarization. The first and second optical detectors 142, 144 can be any type of optical detectors as long as the detectors have the desired optical-to-electrical conversion bandwidths. For example, the first and second optical detectors 142, 144 can be PIN photodetectors with an optical-electrical bandwidth of a least 1 GHz and with an optical-electrical coupling efficiency of at least 0.05%. In some embodiments, a third photodetector 146 can be optically coupled to an output of the DP-QPSK optical modulator 102. The additional third photodetector 146 may be used to lock-in stabilize the variable polarization rotator 140 used to generate the dual-polarization signal. Thus, one feature of the optical transmitter of the present teaching is the direct/indirect detection of AC terms using photodetector that may be built into the optical modulators.

One aspect of the present teaching is the hardware and software that implements various analog processors and digital controllers that are used to stabilize and track various operating points of the DP-QPSK optical modulator 102. The various analog and digital controllers can be pure integral controllers or can be proportional-integral controllers. These controllers are feedback controllers which calculate an "error" value as the difference between a measured process variable and a desired setpoint. The controllers attempt to minimize the error by adjusting the process control inputs. Proportional-integral controllers can operate in a proportional mode, an integral mode, or a proportional-integral mode.

The bias control circuit includes the analog signal processors 104, 104' and the microprocessors 106, 106' for each polarization. In this embodiment, two microprocessors 106, 106' are used for control. However, in other embodiments, only one microprocessor can be used. The analog signal processor 104 includes an analog input that is electrically connected to the output of the first photodetector 142. Similarly the analog signal processor 104' includes an analog input that is electrically connected to the output of the second photodetector 142. The analog-to-digital converters 105, 105' convert the output signals from the analog processors 104, 104' to digital signals that can be processed by the microprocessors 106, 106'. The microprocessors 106, 106' each have three digital outputs that are electrically connected to digital-to-analog converters 148, 148', 150, 150', 152, 152'.

The outputs of the digital-to-analog converters 148, 148', 150, 150', 152, 152' are coupled to inputs of respective adder circuits 156, 156', 158, 158', 160, 160'. The output of pilot tone generators 154, 154' that generate pilot tone signals are electrically connected to other inputs of the adder circuits 156, 156', 158, 158', 160, 160'. The outputs of the adder circuits 156, 156', 158, 158', 160, 160' are electrically connected to respective inputs of differential amplifier 162, 162', 164, 164', 166, 166'. Each of the differential amplifiers 162, 162', 164, 164', 166, 166' include an output and inverse output that are electrically connected to bias inputs of a respective child or parent Mach-Zehnder modulators as shown in FIG. 1. That is, each child and parent Mach-Zehnder modulator is biased by an output and an inverse output of a respective differential amplifier to increase the output voltage swing in order to satisfy the end-of-life drive voltage requirement.

More generally, the bias control circuit including the analog signal processors 104, 104' and the microprocessors 106, 106' has a first and second input electrically connected to respective outputs of the first and second optical detectors 142, 144. A first and second output are electrically coupled to respective bias inputs of the first and second child Mach-Zehnder modulator 116, 120 of the first parent Mach-Zehnder modulator 114. A third output is electrically coupled to a phase bias input of the first parent Mach-Zehnder modulator 114. A fourth and fifth output are electrically coupled to respective bias inputs of the first and second child Mach-Zehnder modulators 130, 134 of the second parent Mach-Zehnder modulator 128. A sixth output is electrically coupled to the phase bias input of the second parent Mach-Zehnder modulator 128. In embodiments that include the third photodetector 146 optically coupled to an output of the outer Mach-Zehnder modulator 108, an output of the third optical detector 146 is electrically connected to an input of the bias control circuit 149 which in turn is connected to analog-to-digital converter 107.

The bias control circuit of the present teaching can include many different components such as the analog processors 104, 104' that generate voltages which correspond to DC photocurrents generated by the first, second, and third optical detectors 142, 144, and 146. The bias control circuit can include analog-to-digital converters that covert AC electrical signals generated by the first, second, and third optical detectors 142, 144, and 146 in response to modulated data to digital data. The microprocessors 106, 106' or other digital processor(s) acquire signals to determine bias signals that stabilize the optical transmitter. In some embodiments, bias control circuits according to the present teaching generate electrical signals in response to both DC and AC signals detected by the first, second, and third optical detectors 142, 144, and 146. The bias control circuit monitors the pilot tone signals generated by the pilot tone generators 154, 154' that are received by the first, second, and third optical detectors 142, 144, and 146 and then generates bias control signals on at least one output that sequentially stabilize at least some of the Mach-Zehnder modulators in response to the monitored pilot tone.

For DP-QPSK operation, the first and second parent Mach-Zehnder modulators 114, 128 are biased at quadrature to establish a π/2 phase shift between signals generated by the corresponding child Mach-Zehnder modulators 116 and 120, 130 and 134 so that the first parent Mach-Zehnder modulator 114 generates the QPSK signal with the first polarization and the second parent Mach-Zehnder modulator 128 generates the QPSK signal with the second polarization.

The bias control signals also stabilize the generated DP-QPSK signal in response to signals generated by the first, second, and third optical detectors 142, 144, and 146. In various modes of operation, the bias control circuit generates electrical signals that stabilize the first and second parent Mach-Zehnder modulators 114, 128 to a quadrature point or to a minimum transmission point that minimizes DC and AC signals detected by the first, second, and third optical detectors 142, 144, and 146. In other embodiments, the bias control circuit generates electrical signals that suppresses or minimizes a fundamental harmonic of a pilot tone applied to a bias signal. Also, the bias control circuit generates electrical signals on at least one output that maximize average DC photocurrent generated by at least one of the first, second, and third optical detectors 142, 144, and 146.

The optical modulator structure in the transmitter 100 of FIG. 1 is very sensitive to the various operating bias points of the two parent Mach-Zehnder modulators 114, 128 and the four child Mach-Zehnder modulators 116, 120, 130, 134 and these operating bias points are sensitive to environmental variations such as temperature. To build a reliable optical transmitter that operates at 100 Gb/s and above data rates that is stable against temperature, will usually require an automatic modulator bias control circuit that is controlled by a microprocessor as described here. One aspect of the present teaching is that the optical transmitter of the present teaching includes analog and digital signal processing that performs automatic lock-in stabilization of various bias points of the two parent Mach-Zehnder modulators 114, 128 and the four child Mach-Zehnder modulators 116, 120, 130, 134.

To implement Time Division Multiplexed (TDM) lock-in stabilization of the DP-QPSK modulator, the output of the synchronous multiplier is directly sampled at a rate which is at least 20 times the fundamental frequency of a pilot tone using a high-speed analog-to-digital converter. This sampled signal is processed digitally in the microprocessors 106, 106' to implement a digital controller which is an integral, proportional, or proportional-integral controller. The output of the digital loop controller is then directed to a respective digital-to-analog converter whose output is amplified by a differential driver amplifier that drives the respective child or parent MZMs embedded into a DP-QPSK modulator using high-speed digital-to-analog converters.

Figure 2:
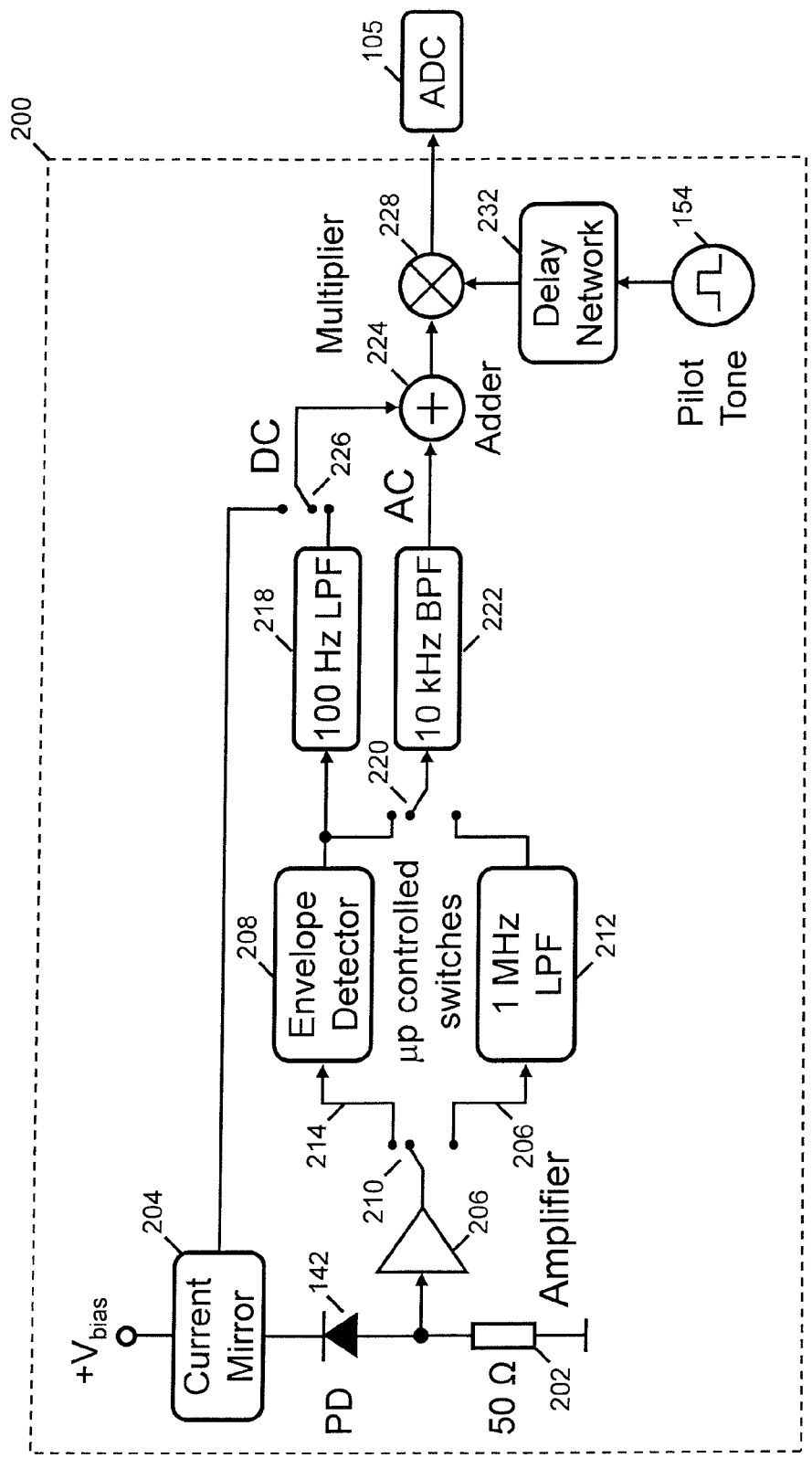
FIG. 2 illustrates one embodiment of an analog signal processor used in the bias control circuit of a DP-QPSK transmitter according to the present teaching that is described in connection with FIG. 1.

FIG. 2 illustrates one embodiment of an analog signal processor 200 used in the bias control circuit of a DP-QPSK transmitter 100 according to the present teaching that is described in connection with FIG. 1. Referring to FIGS. 1 and 2, two analog signal processors are used the DP-QPSK transmitter 100 according to the present teaching. The first analog signal processor 104 has an input that is electrically connected to the output of the first photodetector 142 and the second analog signal processor 104' has an input that is electrically connected to the output of the second photodetector 144. Thus, the first photodetector 142 detects the X-polarized QPSK signal and the second photodetector 144 detects the Y-polarized QPSK signal. The following description of hardware and methods of operation is for one of the analog signal processors 104, 104'. However, it is understood that the hardware and methods of operation is the same for the other analog signal processor.

The photodetector 142 is terminated with a 50 Ohm impedance 202. One aspect of the present teaching is the use of a current mirror 204 that mirrors the DC photocurrent of the photodetector used to detect the QPSK modulated signal for each polarization. A current mirror circuit 204 is electrically connected in series with the photodetector 142. The current mirror circuit 204 generates a DC current that mirrors the DC photocurrent flowing through the photodetector 142. The current mirror circuit 204 accurately monitors the average DC photocurrent of the photodetector per polarization. The voltage corresponding to this photocurrent is then subtracted from the reference voltage and the resulting voltage difference is fed back into a synchronous multiplier with the directly detected AC term for lock-in stabilization of the four child Mach-Zehnder modulators 116, 120, 130, and 134. The output of the current mirror 204 is the DC portion of the error signal of the X or Y polarized QPSK signal, which is the interference between the two modulated DPSK signals for each polarization.

Another aspect of the present teaching is the use of indirect detection of AC error terms with a photodetector 142 followed by a high-speed electronic amplifier 206 and an envelope detector 208 for each polarization. The envelop detector 208 is switched in and out whenever the parent Mach-Zehnder modulators 114, 128 are lock-in stabilized to their corresponding quadrature points. The DC output voltage of the envelop detector 208 along with its AC counterpart is fed back into the synchronous multiplier. More specifically, the output of the photodetector 142 is electrically connected to a high-speed amplifier 206, which amplifies the AC portion of the error signal. The high-speed amplifier 206 has a bandwidth that is high enough to pass the AC error signal information. For example, the bandwidth of the high-speed amplifier 206 should be at least one 1 GHz for 100 GHz data transmission. In addition, the coupling efficiency for the high-speed amplifier 208 should be high enough to pass enough signal so that it can be processed by the analog signal processing hardware.

The output of the high-speed amplifier 206 is electrically connected to a switch 210 that selects either the envelope detector 208 or a low pass filter 212 for further processing. The switch 210 is controlled by the microprocessor 106. In a first switch position, the switch 210 selects a first signal path 214 through the envelope detector 208 for processing the detected X or Y polarized QPSK signal for stabilizing the phase. In a first switch position, the switch 210 selects a second signal path 216 through a low pass filter 212 for stabilizing each of the child Mach-Zehnder modulators 116, 120, 130, and 134.

In the first signal path 214, the detected X, Y polarized QPSK signal passes through the envelope detector 208. The envelope detector 208 is an RF peak detector, such as a diode peak detector, that detects the DC and AC power carried by the input signal. The envelope detector 208 passes both a DC and an AC portion of the error signal. The bandwidth of the envelope detector 208 is chosen to be high enough to pass the AC portion of the error signal including the pilot tone. For example, the bandwidth of the envelope detector 208 is at least one 1 MHz in some systems that transmit data at 100-Gb/s.

The DC and AC portions of the error signal then pass through a second low pass filter 218 that is chosen to pass only the DC portion of the signal. For example, the second low pass filter 218 can be a 100 Hz low pass filter that essentially only passes the DC error signal. In addition, a second switch 220 when positioned in a first position couples a 10 kHz band pass filter 222 to the output of the envelope detector 208 so that it passes only AC error signals in the 10 kHz band, which includes the pilot tone signal. The second switch 220 is also controlled by the microprocessor 106.

In the second signal path 216, the detected X, Y polarized QPSK signal passes through the low pass filter 212. In one embodiment, the low pass filter 212 is a 1 MHz low pass filter that passes the DC portion of the error signal and the AC portion of the error signal below 1 MHz. The second switch 220 is electrically connected a 10 kHz band pass filter 222 in the second signal path 216 when positioned in a second position. The 10 kHz band pass filter 222 passes only error signals in the 10 kHz band, which includes the pilot tone signal.

An adder circuit 224 is used to combine signals from the current mirror 204, envelope detector 208 and the low pass filter 212 in various ways depending upon the switching configuration. The adder circuit 224 includes a first input that is electrically connected to the output of a third switch 226 that selects between the 100 Hz low pass filter 218 and the output of the current mirror 204. A second input of the adder circuit 224 is electrically connected to output of the 10 kHz band pass filter 222 that is electrically connected to the output of the second switch 220.

The output of the adder circuit 224 is electrically connected to a first input of a multiplier 228. The output of the pilot tone generator 154 is electrically connected to the delay network 232 that delays the pilot tone signal in time. The output of the delay network 232 is electrically connected to the second input of the multiplier 228. The delay generated by the delay network 232 is adjusted so that only the error is detected at the pilot tone frequency. The output of the multiplier 228 is electrically connected to the analog-to-digital converter 105 described in connection with the optical transmitter of FIG. 1.

For stabilizing the phase of the transmitter 100, the first switch 210 selects the first signal path 214, where the second switch 220 electrically connects the 10 kHz band pass filter 222 to the output of the envelop detector 208 and the third switch 226 electrically connects the 100 Hz low pass filter 218 to the first input of the adder circuit 224. The adder circuit 224 combines the DC portion of the signal detected by the envelope detector 208 that is filtered with the 100 Hz low pass filter 218 with the AC portion of the signal detected by the envelope detector 208 that is filtered with the 10 kHz band pass filter 222. The multiplier 228 multiplies the broad band interference noise with a delayed reference pilot tone signal to separate the detected pilot tone from the rest of the broad-band interference noise. The analog-to-digital converter 105 converts the multiplied signal into a digital signal so that it can be processed by the microprocessor 106. In some methods of operation, whenever you switch from the first signal path 214 to the second signal path 216, the output of the analog-to-digital converter 105 is processed by the microprocessor 106.

Figure 3:
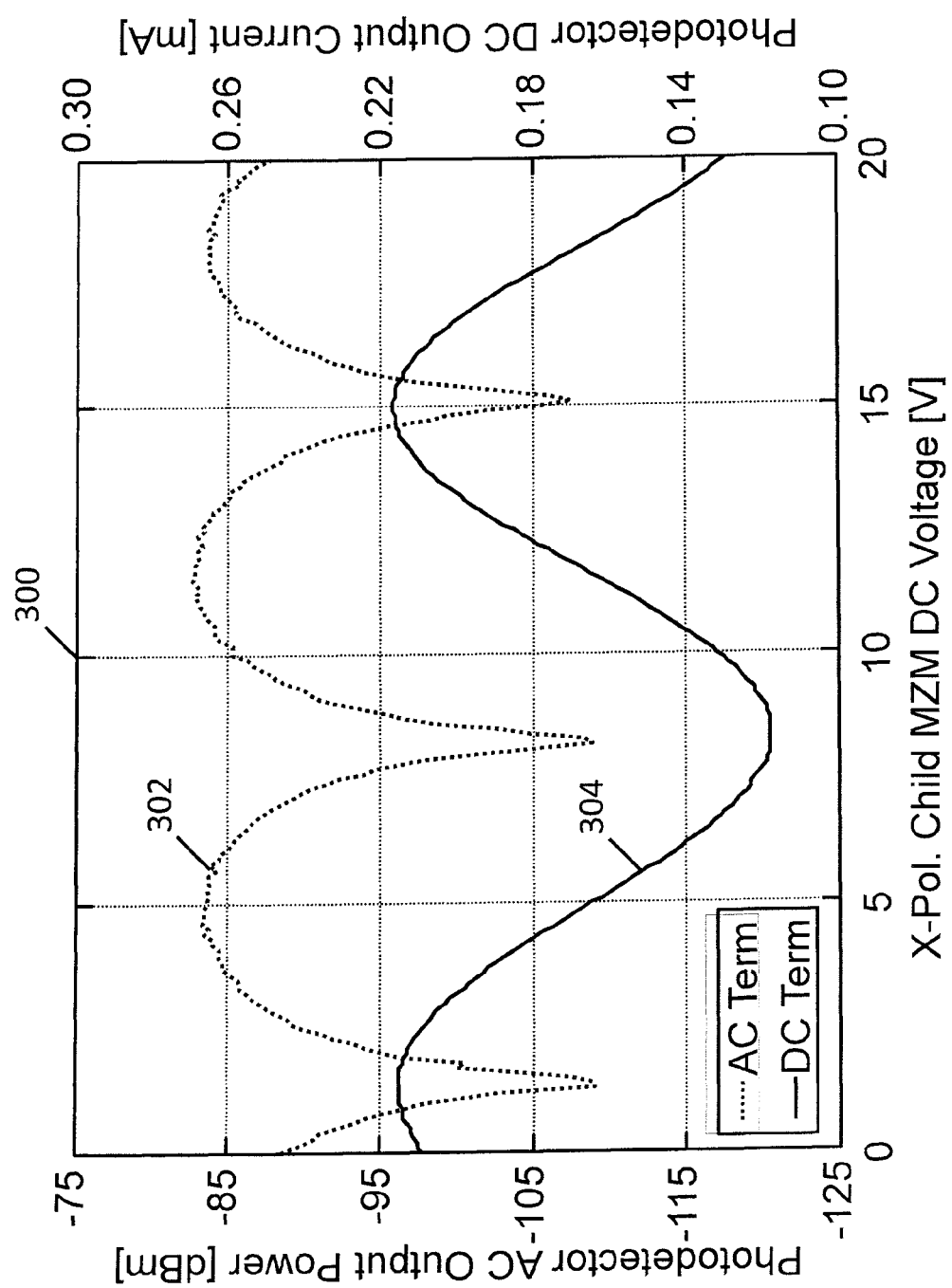
FIG. 3 illustrates graphs of the AC photodetector output power in dBm and the DC photodetector output current in milliamps, both as a function of the DC voltage applied to one of the child Mach-Zehnder modulators.

FIG. 3 illustrates graphs 300 of the AC photodetector output power in dBm 302 and the DC photodetector output current in milliamps 304, both as a function of the DC voltage applied to the child Mach-Zehnder modulators. These graphs 300 illustrate the desired bias condition for the child Mach-Zehnder modulators for the DP-QPSK transmitter of the present teaching. There are three AC minimums of the AC photodetector output power that occur as the bias voltage applied to the Mach-Zehnder modulator is increased from zero to 20 volts. The first and third AC minimums occur when maximum transmission occurs and the photodetector's DC output current is at a maximum value. The bias conditions for maximum transmission where the photodetector's output current is a maximum occurs when the Mach-Zehnder modulator bias voltage is at 2 and 15 volts. The second AC minimum occurs at about 7 volts when minimum transmission occurs and the photodetector's output current is at a minimum. The output power of the modulator is about −30 dB for minimum transmission. Each of the Mach-Zehnder modulators is biased at their minimum transmission point where they are in a DC off condition. That is, the modulators are biased so that there are no NRZ signals driving the modulator.

The graphs 300 of the AC photodetector output power in dBm 302 and the DC photodetector output current in milliamps 304 as a function of the DC voltage applied to the child Mach-Zehnder modulators show that if the transmitter were to monitor only AC pilot tones alone, the transmitter could lock onto the first or third AC minimums instead of the second AC minimum. Consequently, both the AC pilot tone and the DC photocurrent must be monitored simultaneously for each polarization to determine the correct bias point stabilization for each of the four child Mach-Zehnder modulators.

Thus, the characteristics of the graphs 300 shown in FIG. 3 illustrate that to bias stabilize the child Mach-Zehnder modulators to minimum transmission, it is necessary to both suppress the fundamental harmonic of the pilot tone (AC) and to ensure that the average DC photocurrent of the photodetector is at its maximum value (DC) for proper lock-in stabilization when NRZ signals drive the respective child Mach-Zehnder modulator with a peak-to-peak voltage swing of $2V_\pi$. In theory, one can use only the AC term, but then the DC voltage range has to be limited otherwise bias stabilization scheme could bring the modulator to a point of maximum transmission where the AC term once again goes through its minimum value. However, to satisfy the end-of-life DC bias voltage requirement of a 100-Gb/s DP-QPSK modulator, the operating DC bias voltage range cannot be restricted. Therefore, it is necessary to monitor both the AC term and the DC term while doing lock-in stabilization for child Mach-Zehnder modulators 116, 120, 130, and 134.

Figure 4:
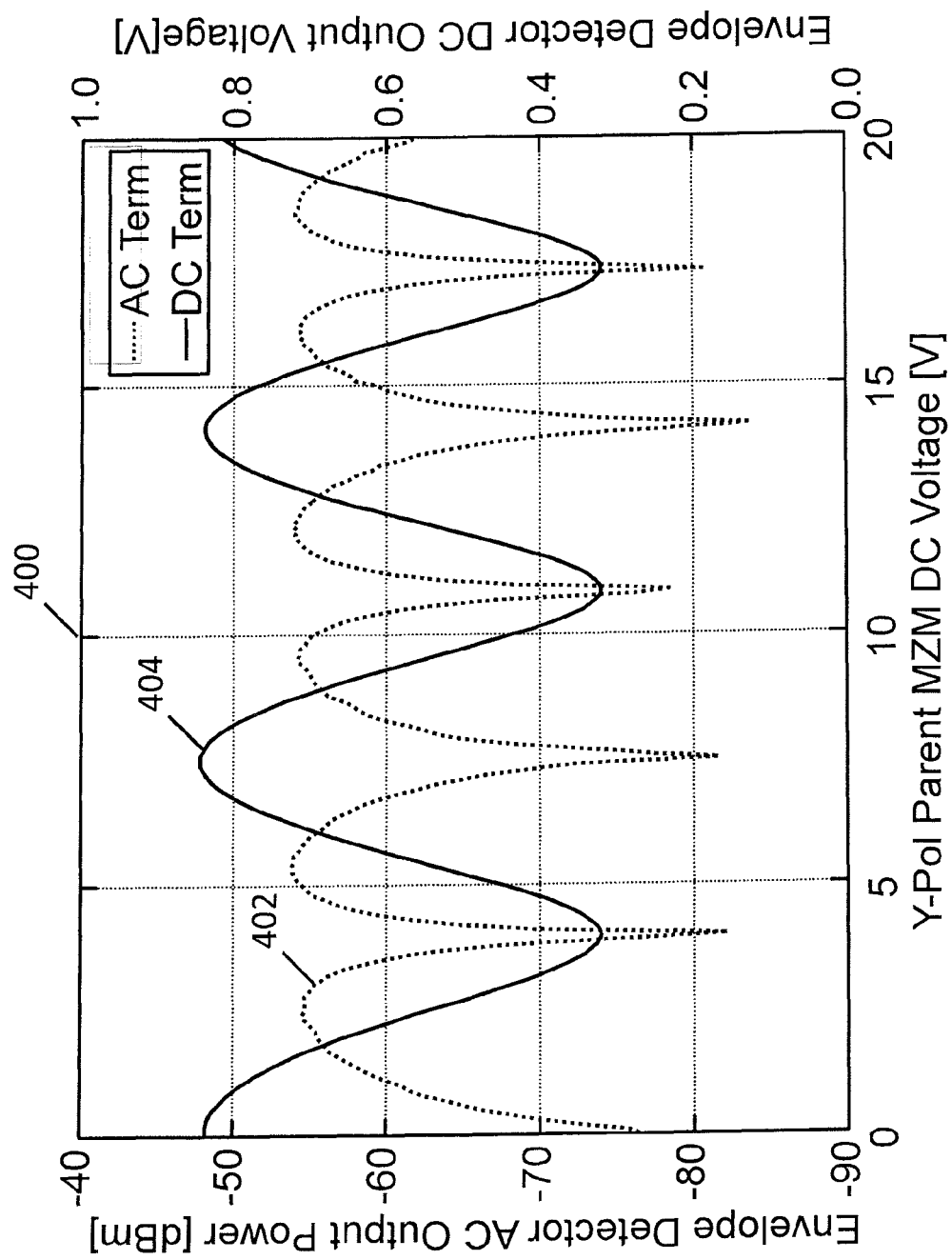
FIG. 4 illustrates graphs of AC output power of the envelope detector in dBm and DC output voltage of the envelope detector in volts both as a function of DC bias voltage applied to one of the parent Mach-Zehnder modulators.

FIG. 4 illustrates graphs 400 of AC output power of the envelope detector 208 in dBm 402 and DC output voltage of the envelope detector in volts 404 both as a function of DC bias voltage applied to the parent Mach-Zehnder modulators. These graphs 402, 404 illustrate the desired bias conditions of the parent Mach-Zehnder modulators for the DP-QPSK transmitter of the present teaching. The graph of AC output power of the envelope detector 402 is for the pilot tone signal. In order to stabilize the phase of the parent Mach-Zehnder modulator, both the AC and DC output of the envelope detector 208 must be at a minimum. Thus, according to the graphs 402, 404, in order to stabilize the phase of the parent Mach-Zehnder modulator, the DC bias voltage should be locked at either 4, 11, or 17 Volts.

The graphs 400 of the AC output power of the envelope detector 208 in dBm 402 and the DC output of the envelope detector in volts 404 as a function of the DC voltage applied to the parent Mach-Zehnder modulators show that if the transmitter were to monitor only AC pilot tones alone, the transmitter could lock onto the wrong quadrature point and hence polarity of the modulated data at the output of the 100-Gb/s optical transmitter. That is, both the DC and AC output of the envelope detector 208 must be monitored simultaneously to determine the correct bias stabilization points so that the parent Mach-Zehnder modulators are stabilized to their respective quadrature points.

Thus, the two parent Mach-Zehnder modulators 114, 128 are biased at the quadrature points to get the proper 90 degree optical phase shift between the two PSK signals generated by the corresponding two child Mach-Zehnder modulators 116 and 120, 130 and 134 to generate a QPSK signal for each of the X and Y polarizations. To bias stabilize the two parent Mach-Zehnder modulators 114, 128 to quadrature points, it is necessary to minimize the DC signal generated by the envelop detector 208 which measures the interference between the two modulated PSK signals. The interference is at a minimum when these two PSK signals are combined in phase quadrature (a desired QPSK signal) per polarization. Also, it is necessary to suppress the fundamental harmonic of the pilot tone (AC) which is indirectly detected by the envelop detector. In principle, only the DC voltage generated by the envelop detector can be monitored to bias stabilize the parent Mach-Zehnder modulators 114, 128, but then the operating DC voltage range must be restricted which is undesirable because the device will not meet the end-of-life requirement of a 100-Gb/s optical modulator. Therefore, it is necessary to monitor both the DC and AC terms while performing lock-in stabilization for the parent Mach-Zehnder modulators.

Figure 5:
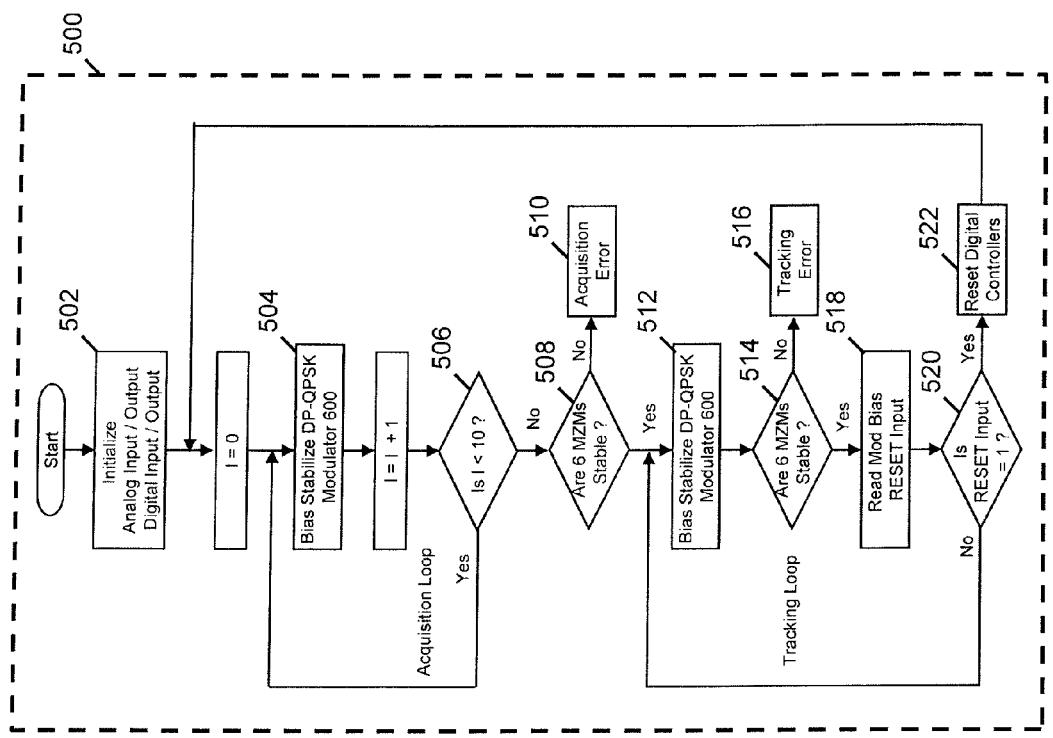
FIG. 5 illustrates a flow chart of one embodiment of a method of stabilizing a DP-QPSK transmitter according to the present teaching that performs switching as well as implements the digital closed loop controllers to bias stabilize the high data rate optical modulators, such as 100-Gb/s DP-QPSK optical modulator.

FIG. 5 illustrates a flow chart 500 of one embodiment of a method of stabilizing a DP-QPSK transmitter according to the present teaching that performs switching as well as implements the digital loop controllers to bias stabilize the high data rate optical modulators, such as 100-Gb/s DP-QPSK optical modulator. In many modes of operation, the four individual child Mach-Zehnder modulators 116, 120 130, and 134 are individually lock-in stabilized at bias points that generate four PSK signals. Also, the two parent Mach-Zehnder modulators 114, 128 are lock-in stabilized at bias points which generate dual polarization QPSK (PD-QPSK) signals for transmission. Switching time division multiplexing using six different proportional-integral loop controllers is used for bias stabilization.

Referring to FIGS. 1, 2, Sand 6, in a first step 502 of a method according to the present teaching, the analog signal processor 104 is initialized where the analog and digital inputs and outputs are configured. In a second step 504, the bias stabilization algorithm is initiated to acquire the relevant stabilization bias points of the DP-QPSK modulator. In the initial acquisition loop, the DP-QPSK modulator is lock-in stabilized using time division multiplexed digital loop controllers for at least ten iterations. That is, a determination is made as to what child or parent Mach-Zehnder modulator should be stabilized next according to the method 600 of bias stabilizing the DP-QPSK modulator of FIG. 6. For example, the method can first stabilize the first (I) and then second (Q) child Mach-Zehnder modulator in the X polarization, then stabilize the parent Mach-Zehnder modulator in the X polarization, then stabilize the first (I) and then second (Q) child Mach-Zehnder modulator in the Y polarization, then stabilize the parent Mach-Zehnder modulator in the Y polarization. In some embodiments described herein, each of the child Mach-Zehnder modulators 116, 120, 130, 134 and the parent Mach-Zehnder modulators 114 and 128 are stabilized sequentially. However, in other apparatus and methods according to the present teaching, at least some of the child Mach-Zehnder modulators 116, 120, 130, 134 and the parent Mach-Zehnder modulators 114 and 128 are stabilized in both the X polarization and Y polarization simultaneously.

Figure 6:
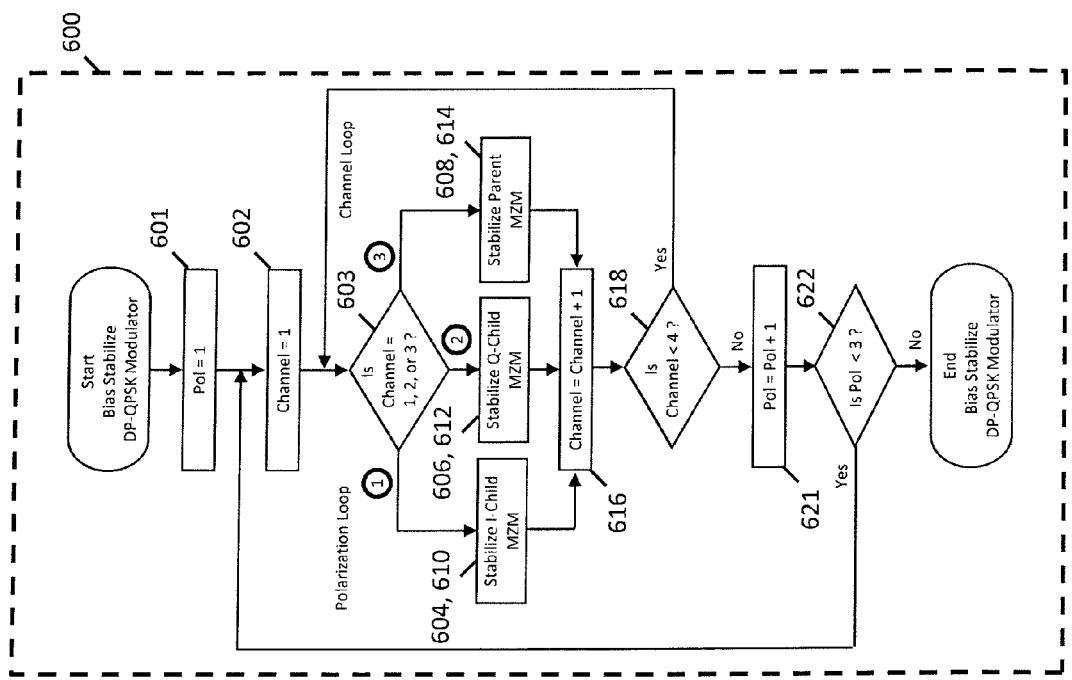
FIG. 6 illustrates a method of bias stabilizing the DP-QPSK modulator according to the present teaching.

Referring now to FIG. 6, which is a method of bias stabilizing the DP-QPSK modulator according to the present teaching. The first step 601 sets the polarization switch to "1" ("1" for X-polarization and "2" for Y-polarization). The second step 602 sets the channel switch to "1" for the I-Child MZM, "2" for the Q-Child MZM, and "3" for the Parent MZM to be stabilized. The third step 603 determines which Mach-Zehnder modulator in X-polarization or Y-polarization QPSK needs to be stabilized. The first (I) child Mach-Zehnder modulator 604 for the X polarization is stabilized using the second signal path 216 in the analog signal processor 104. The fourth step 606 stabilizes the second (Q) child Mach-Zehnder modulator for the X polarization using the second signal path 216 in the analog signal processor 104. The fifth step 608 stabilizes the parent Mach-Zehnder modulator 114 for the X polarization using the first signal path 214 in the analog signal processor 104. This method is then repeated for the Y polarization.

The sixth step 610 stabilizes the first (I) child Mach-Zehnder modulator 130 for the Y polarization using the second signal path 216 in the analog signal processor 104'. The seventh step 612 stabilizes the second (Q) child Mach-Zehnder modulator 134 for the Y polarization using the second signal path 216 in the analog signal processor 104'. The eighth step 614 stabilizes the parent Mach-Zehnder modulator 128 for the Y polarization using the first signal path 214 in the analog signal processor 104'.

After each step, the state of the analog-to-digital signal processor 104, 200 and the microprocessor 106 controlling the bias control circuits for the parent and child Mach-Zehnder modulators is switched in step 616. In an acquisition mode of operation, the stabilization is performed with the method 600 of bias stabilizing the DP-QPSK modulator for three Mach-Zehnder modulators (two child and one parent Mach-Zehnder modulator) for each of the X and Y polarizations. The process is then repeated for 10 times (step 506 in FIG. 5) for all child and parent Mach-Zehnder modulator stabilizations.

The fourth step 508 is a decision step to determine if all the Mach-Zehnder modulators are stabilized or not using the method 600 of bias stabilizing the DP-QPSK modulator. If any of the Mach-Zehnder modulators can't be stabilized for some reason, then an acquisition error is issued in step 510. If all of the child and parent Mach-Zehnder modulators are stabilized to their respective points, the method is repeated in the tracking mode of operation. In the tracking mode of operation, the respective bias points of the child and parent Mach-Zehnder modulator are stabilized continuously on a time division multiplexed basis as described in connection with the method 600 of bias stabilizing the DP-QPSK modulator.

In the first step 512 of the tracking mode of operation, the method 600 of bias stabilizing the DP-QPSK modulator described in connection with FIG. 6 is executed. A determination is made as to what child or parent Mach-Zehnder modulator should be tracked next. For example, the method can first track the first (I) and then second (Q) child Mach-Zehnder modulator in the X polarization, then track the parent Mach-Zehnder modulator in the X polarization, then track the first (I) and then second (Q) child Mach-Zehnder modulator in the Y polarization, then track the parent Mach-Zehnder modulator in the Y polarization. In some embodiments described herein, each of the child Mach-Zehnder modulators 116, 120, 130, 134 and the parent Mach-Zehnder modulators 114 and 128 are tracked sequentially. However, in other apparatus and methods according to the present teaching, at least some of the child Mach-Zehnder modulators 116, 120, 130, 134 and the parent Mach-Zehnder modulators 114 and 128 is tracked in both the X polarization and Y polarization simultaneously.

In the second step 514 of the tracking mode of operation a decision step is performed to determine whether all four child and two parents Mach-Zehnder modulators are stable or not. If any one or more Mach-Zehnder modulator cannot be tracked for their respective bias points, then a tracking error is issued in step 516.

In the tracking modes of operation, whenever the operating wavelength of the integrated tunable laser assembly is changed by the network, the optical phases of the parent Mach-Zehnder modulators need to be reset. To facilitate this, a modulator bias stabilization algorithm reads the modulator bias reset input once in the third step 518. In fourth step 520, the decision is made depending on the logic state of the modulator bias reset input. If the modulator bias reset input is at logic '0' then the method 600 of bias stabilizing the DP-QPSK modulator performed in step 512 is executed as per tracking mode of operation. If the modulator bias reset input is at logic '1' then the optical transmitter's bias control circuit automatically resets the corresponding phases of the first and second parent Mach-Zehnder modulator that generates QPSK signals in first and second polarization so as to correctly set the λ/4 phase difference in response to a change in an operating wavelength of a tunable DP-QPSK optical transmitter. Also, the child Mach-Zehnder modulators 116, 120, 130, 134 have a small wavelength dependence on the DC bias. The bias signals to the child Mach-Zehnder modulators 116, 120, 130, 134 can also be reset every time the wavelength changes. In addition, the microprocessor can be programmed to compensate for this wavelength dependence. Once the digital loop controllers are reset, then the modulator bias stabilization algorithm automatically switches to acquisition mode of operation.

Figures 7A, 7B:
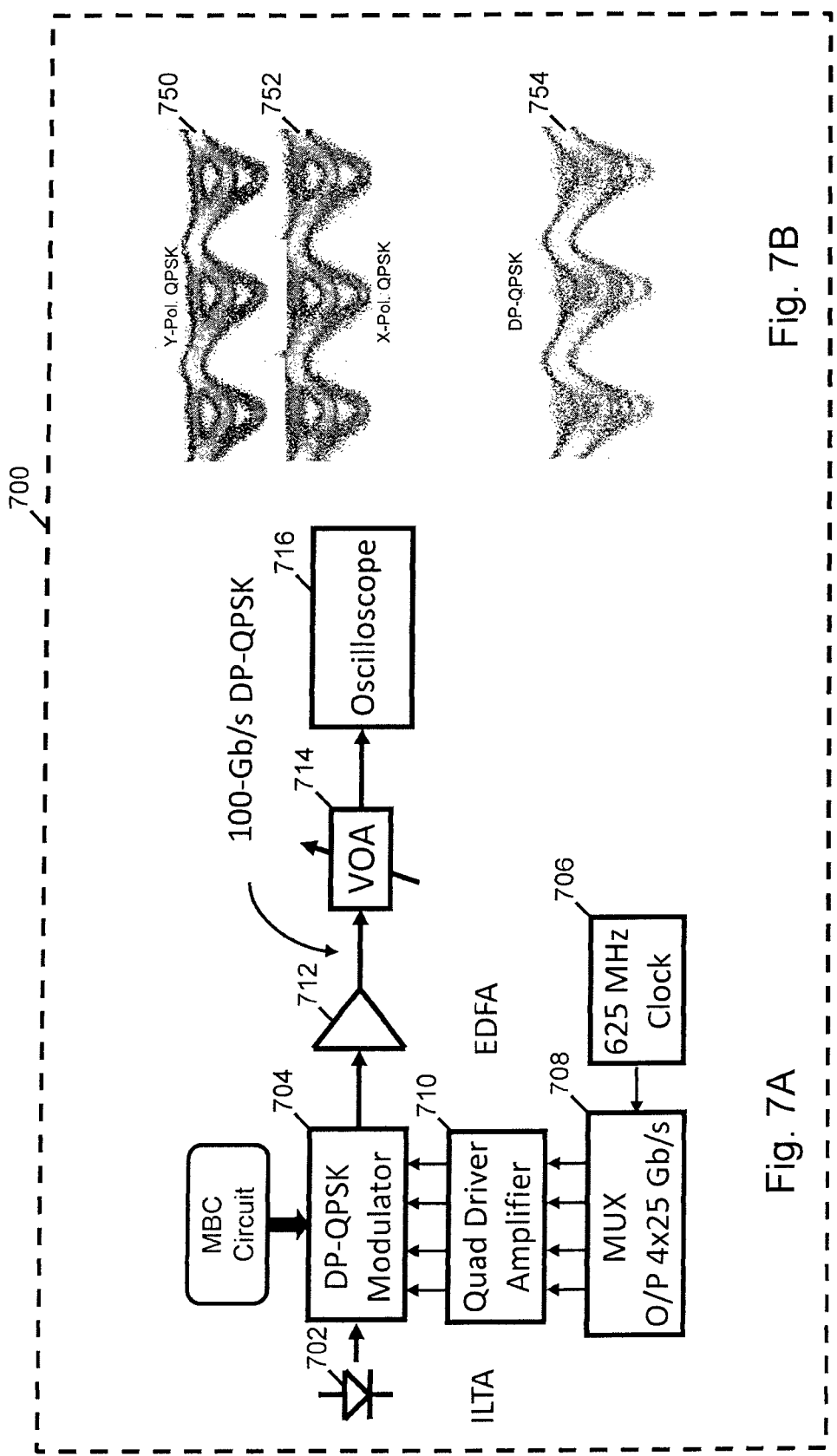
FIG. 7A illustrates an experimental test apparatus for a DP-QPSK transmitter according to the present teaching.
FIG. 7B illustrates experimental results as eye diagrams of X and Y polarized QPSK signals and for the combined DP-QPSK signal that were generated using the experimental test set apparatus for a DP-QPSK transmitter that is shown in FIG. 7A.

FIG. 7A illustrates an experimental test apparatus 700 for a DP-QPSK transmitter according to the present teaching. The experimental test set apparatus 700 was designed to characterize a 100-Gb/s DP-QPSK signal generated with the DP-QPSK transmitter and bias control circuit according to the present teaching. The experimental test apparatus 700 includes an integrated tunable laser source 702 that generates CW optical power at its output. The output of the tunable laser source 702 is optically coupled to an input of a DP-QPSK modulator 704 according to the present teaching, such as the DP-QPSK modulator 108 that is described in connection with FIG. 1.

A 625 MHz reference clock 706 is used to drive a multiplexer 708 that generates the four 25 Gb/s signals that drive the four single-ended modulator driver amplifiers 710 which in turn drive the RF inputs of four child Mach-Zehnder modulators 116, 120, 130, and 134 as described in connection with the optical transmitter of FIG. 1. The reference clock 706 has a clock rate that is $1/40^{th}$ of the data rate. The output of the DP-QPSK modulator 704 is optically connected to an EDFA 712 that amplifies the modulated PD-QPSK optical signal. The output of the EDFA 712 is optically connected to a variable optical attenuator 714 that attenuates the modulated optical signal to a level appropriate for monitoring by an oscilloscope 716. The output of the variable optical attenuator 714 is optically coupled to the oscilloscope 716, which displays eye diagrams of the X, Y polarized QPSK modulated optical signals and the combined DP-QPSK optical signal.

FIG. 7B illustrates experimental results as eye diagrams of X and Y polarized QPSK signals and for the combined DP-QPSK signal that were generated using the experimental test set apparatus for a DP-QPSK transmitter that is shown in FIG. 7A. The first eye diagram 750 shows a 25-Gb/s QPSK signal that is Y polarized. The second eye diagram 752 shows a 25-Gb/s QPSK signal that is X polarized. The third eye diagram 754 shows the multiplexed DP-QPSK signal having four levels.

EQUIVALENTS

While the applicants' teaching is described in conjunction with various embodiments, it is not intended that the applicants' teaching be limited to such embodiments. On the contrary, the applicant's teaching encompass various alternatives, modifications, and equivalents, as will be appreciated by those of skill in the art, which may be made therein without departing from the spirit and scope of the teaching.

We claim:

1. A dual polarization optical modulator comprising:
   a) a first Mach-Zehnder modulator superstructure comprising two parallel child Mach-Zehnder optical modulators, the first Mach-Zehnder modulator superstructure modulating a first optical signal with a first polarization;
   b) a second Mach-Zehnder modulator superstructure comprising two parallel child Mach-Zehnder optical modulators, the second Mach-Zehnder modulator superstructure being optically coupled in parallel with the first Mach-Zehnder modulator superstructure to form a dual polarization optical modulator having an optical input that receives an optical beam from a laser source, the second Mach-Zehnder modulator superstructure modulating a second optical signal with a second polarization and the dual polarization optical modulator multiplexing the first optical signal with the first polarization and the second optical signal with the second polarization to form a dual polarization optical signal;
   c) a first optical detector coupled to an output of the first Mach-Zehnder modulator superstructure;
   d) a second optical detector coupled to an output of the second Mach-Zehnder modulator superstructure;
   e) a third optical detector connected to an output of the dual polarization optical modulator; and
   f) a bias control circuit having a first, second, and third input electrically connected to an output of a respective one of the first, second, and third optical detectors and a first output electrically connected to a bias input of the first Mach-Zehnder modulator superstructure and a second output electrically connected to a bias input of the second Mach-Zehnder modulator superstructure, the bias control circuit generating bias signals on at least one of the first and second outputs in response to both DC and AC signals detected by at least one of the first, second, and third optical detectors that stabilizes the dual polarization signal, wherein the bias control circuit generates an electrical signal on at least one of the first and second outputs that maximizes average DC photocurrent generated by at least one of the first, second, and third optical detectors.

2. The dual polarization optical modulator of claim 1 wherein the laser source comprises a tunable laser source.

3. The dual polarization optical modulator of claim 1 wherein the first and second Mach-Zehnder modulator superstructures comprise Mach-Zehnder modulators formed of lithium niobate.

4. The dual polarization optical modulator of claim 1 wherein the first and second Mach-Zehnder modulator superstructures comprise Mach-Zehnder modulators formed of a III-V semiconductor.

5. The dual polarization optical modulator of claim 1 wherein the first and second Mach-Zehnder modulator superstructures comprise Mach-Zehnder modulators formed of a II-VI semiconductor.

6. The dual polarization optical modulator of claim 1 wherein the bias control circuit comprises a proportional integral controller.

7. The dual polarization optical modulator of claim 1 wherein the bias control circuit comprises a pure integral controller.

8. The dual polarization optical modulator of claim 1 wherein the bias control circuit comprises an analog processor that generates a voltage on at least one of the first and second outputs that corresponds to a DC photocurrent generated by at least one of the first, second, and third optical detectors.

9. The dual polarization optical modulator of claim 1 wherein the bias control circuit generates electrical signals on at least one of the first and second outputs that stabilize the first and second Mach-Zehnder modulator superstructure to a quadrature point.

10. The dual polarization optical modulator of claim 1 wherein at least one of the first, second, and third optical detectors comprises a PIN photodetector with an optical-electrical bandwidth of a least 1 GHz.

11. The dual polarization optical modulator of claim 1 wherein at least one of the first, second, and third optical detectors comprises a PIN photodetector with an optical-electrical coupling efficiency of at least 0.05%.

12. The dual polarization optical modulator of claim 1 wherein the bias control circuit comprises a digital processor and an analog-to-digital converter, the analog-to-digital converter converting AC electrical signals generated by at least one of the first, second, and third optical detector in response to modulated digital data, the digital processor processing the AC electrical signals to determine bias signals that are generated by at least one of the first and the second outputs that stabilize the dual polarization modulator.

13. The dual polarization optical modulator of claim 1 wherein the bias control circuit monitors a pilot tone received by at least one of the first, second, and third optical detectors and generates a bias control signal on at least one of the first and second outputs at a time that stabilize the dual polarization optical modulator in response to a monitored pilot tone.

14. The dual polarization optical modulator of claim 1 wherein the bias control circuit generates a bias control signal on at least one of the first and second outputs that either maximizes or minimizes DC and minimizes AC signals detected by the first, second, and third optical detectors.

15. The dual polarization optical modulator of claim 1 wherein the bias control circuit generates a bias control signal on at least one of the first and second outputs that minimize a fundamental harmonic of an AC pilot tone applied to a bias signal and that is detected by at least one of the first, second, and third optical detectors.

16. The dual polarization optical modulator of claim 1 wherein the bias control circuit generates an electrical signal on at least one of the first and second outputs that suppresses a fundamental harmonic of a pilot tone.

17. The dual polarization optical modulator of claim 1 wherein the bias control circuit comprises a first analog processor connected to the first optical detector, a second analog processor connected to the second optical detector, and a third analog processor connected to the output of the third optical detector.

18. The dual polarization optical modulator of claim 1 wherein the bias control circuit comprises a first differential amplifier with a non-inverting output and an inverse output electrically connected to the bias input of the first Mach-Zehnder modulator superstructure and a second differential amplifier with a non-inverting output and an inverse output electrically connected to the bias input of the second Mach-Zehnder modulator superstructure.

19. The dual polarization optical modulator of claim 1 wherein the bias control circuit comprises at least one analog processor or at least one digital processor that calculates an error value of a difference between a measured value at an input and a desired setpoint and corrects the bias signals generated in response to the errors.

* * * * *